United States Patent [19]

Matsuo et al.

[11] 4,422,415
[45] Dec. 27, 1983

[54] INTAKE SYSTEM OF ENGINES

[75] Inventors: Noritaka Matsuo; Koichiro Takeuchi, both of Iwata; Tokuji Muramatsu, Hamakita, all of Japan

[73] Assignee: Yamaha Motor Co., Ltd., Japan

[21] Appl. No.: 277,631

[22] Filed: Jun. 26, 1981

[30] Foreign Application Priority Data

Jun. 28, 1980 [JP] Japan .................................. 55-88067

[51] Int. Cl.³ ............................................. F02M 35/00
[52] U.S. Cl. ............................. 123/52 M; 123/52 MB
[58] Field of Search ................ 123/52 M, 52 MB, 518

[56] References Cited
U.S. PATENT DOCUMENTS 3,814,069 6/1974 Croft et al. ..................... 123/52 MF
4,285,320 8/1981 Webster et al. ................ 123/52 MF

FOREIGN PATENT DOCUMENTS 2378183 8/1978 France .............................. 123/52 M Primary Examiner—Craig R. Feinberg
Attorney, Agent, or Firm—Ernest A. Beutler

[57] ABSTRACT

Two embodiments of induction systems for internal combustion engines that improve charging efficiency, particularly at low speeds and throttle openings. In each embodiment a plenum chamber is provided that communicates with the induction system between the throttle valve and the chamber which is served. In each embodiment a control valve controls the communication of the plenum chamber with the induction passage for substantially restricting the communication when the throttle valve of the engine is in its wide open position.

4 Claims, 6 Drawing Figures

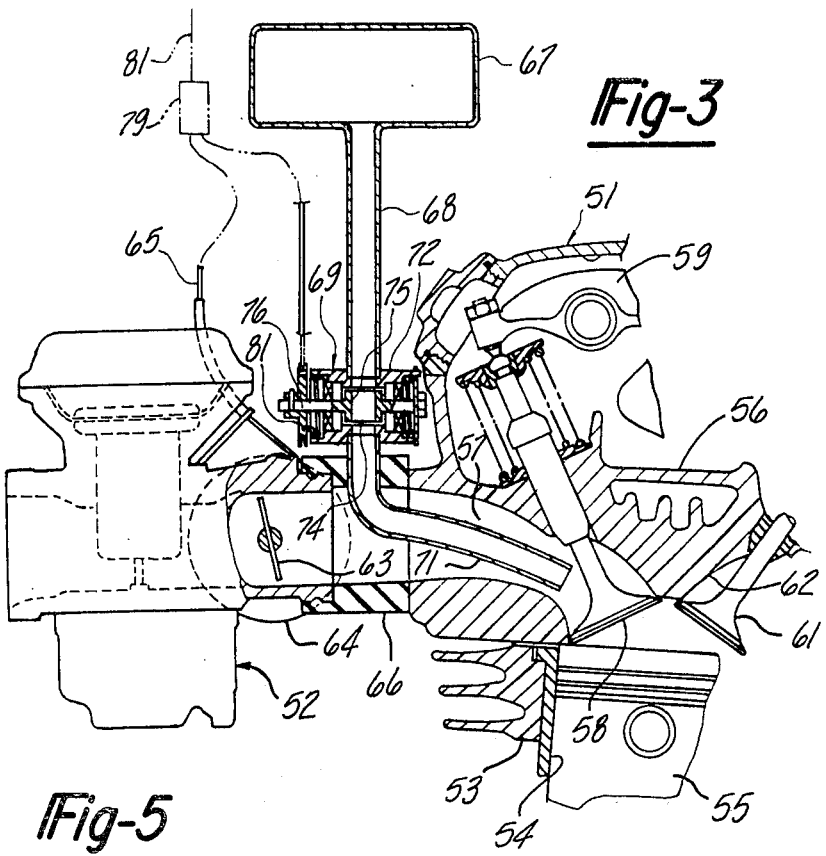
*Fig-3*
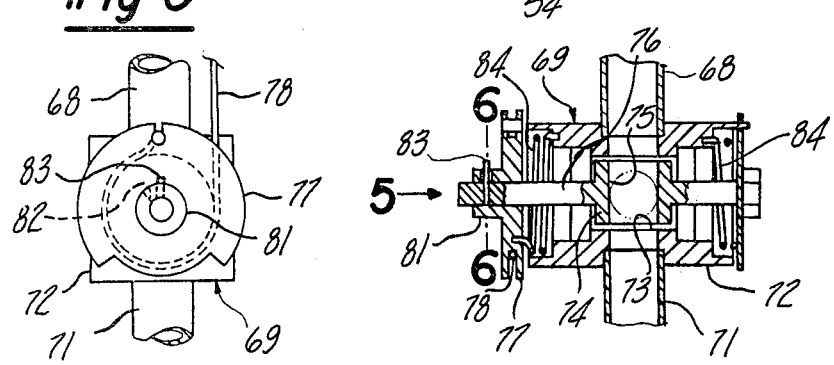
*Fig-5*
*Fig-4*
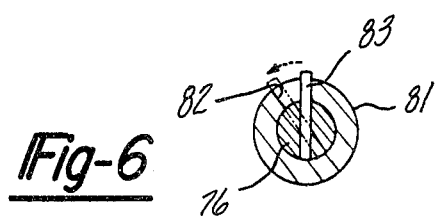
*Fig-6*

INTAKE SYSTEM OF ENGINES

BACKGROUND OF THE INVENTION

This invention relates to an intake system for engines and more particularly to an intake system that improves the engine induction efficiency, particularly at low and medium speeds.

It has been acknowledged that the charging efficiency of an internal combustion engine, particularly at low and medium speeds is not particularly good. This results in reduced engine performance and occurs as a result of the successive starting and stopping of the induction charge downstream of the throttle valve as the intake valve or intake port is sequentially opened and closed. Each time the intake valve or port is open the inertia of the stopped intake charge must be overcome and the poor charging efficiency results. This problem is particularly prevalent in two-cycle engines.

It has recently been discovered that these difficulties with low speed charging efficiency may be significantly overcome by providing a plenum chamber that communicates with the intake system downstream of the throttle valve. The use of such a plenum chamber provides a volume in which vacuum is exerted at the point of closure of the intake valve or intake port which vacuum causes a continuous flow even after the valve or port is closed. This results in a more uniform flow through the intake passage, even at low speeds, and charging efficiency is improved. The theory behind this concept and several embodiments of incorporating it are disclosed in the copending application of Noritaka Matsuo et al. entitled Intake System for Engine, Ser. No. 163,201, filed June 25, 1980 and assigned to the assignee of this application.

Although the systems disclosed in that application are particularly effective in improving running at low speeds, particularly when the throttle valve has a relatively small opening, it has been found that in some conditions the use of the plenum chamber may actually deteriorate engine performance. This condition seems to occur when the throttle valve is at a fairly widely open position but the engine is still running at a relatively low speed.

It is, therefore, a principal object of this invention to provide an improved induction system for an internal combustion engine.

It is another object of this invention to provide an engine induction system that improves performance throughout all facets of the engine operation.

It is another object of this invention to provide an improved engine induction system through the use of a plenum chamber and by controlling the communication of the plenum chamber with the intake system.

SUMMARY OF THE INVENTION

This invention is adapted to be embodied in an induction system for a variable volume chamber of an internal combustion engine having an induction passage for supplying the chamber, a throttle valve for controlling the flow through the induction passage, a plenum chamber and means for communicating the plenum chamber with the induction passage between the throttle valve and the variable volume chamber. In accordance with the invention, means control the communication of the plenum chamber with the induction passage in response to a running condition of the engine.

BRIEF DESCRIPTION OF THE DRAWINGS

FIG. 3 i a side elevational view, with portions shown in section, similar to FIG. 1 and showing another embodiment of the invention;

FIG. 4 is an enlarged cross-sectional view of the control valve of the embodiment of FIG. 3;

FIG. 5 is a side elevational view of the control valve looking in the direction of the arrow 5 in FIG. 4;

FIG. 6 is a cross-sectional view taken along the line 6—6 of FIG. 4 and shows a lost motion connection.

DETAILED DESCRIPTION OF THE PREFERRED EMBODIMENTS

Figure 1:
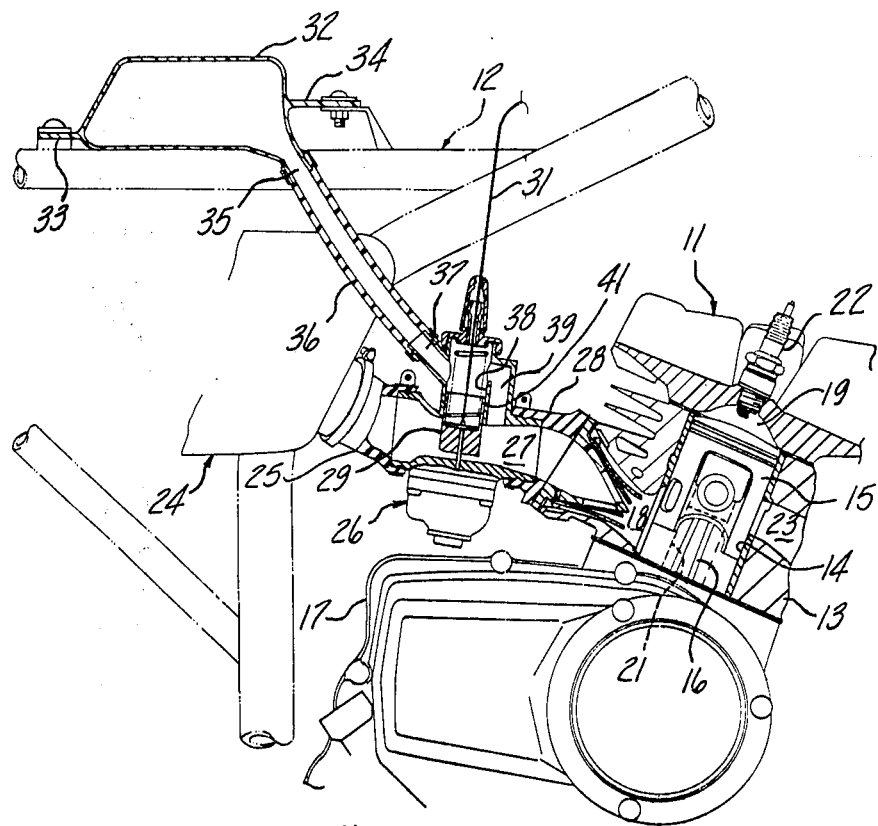
FIG. 1 is a side elevational view, with portions shown in section, of an internal combustion engine constructed in accordance with a first embodiment of the invention.
Figure 2:
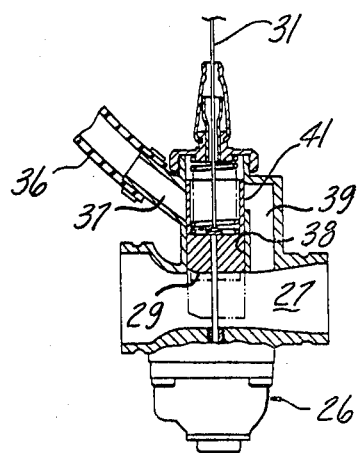
FIG. 2 is an enlarged cross-sectional view of the carburetor and control valve of the engine shown in FIG. 1.

Embodiment of FIGS. 1 and 2

In this embodiment a motorcycle engine constructed in accordance with the invention is identified generally by the reference numeral 11. The engine 11 is of the single cylinder two-stroke type, although as will become apparent this invention is susceptible for use with engines of other types and having greater numbers of cylinders. The engine 11 is adapted to be mounted in any suitable manner in the frame of a motorcycle shown partially in phantom and identified generally by the reference numeral 12.

The engine 11 includes a cylinder block 13 having a cylinder bore 14 in which a piston 15 reciprocates. The piston 15 is connected by means of a connecting rod 16 so as to drive a crankshaft (not shown) which is positioned within a crank case 17 of the engine in a known manner.

A charge is delivered to the crank case cavity from a cylinder block intake port 18 for compression and transfer to the engine combustion chamber 19 through transfer or scavenge ports 21 in a known manner. The charge transferred to the combustion chamber 19 is fired in a known manner by means of a spark plug 22 and is then exhausted through an exhaust port 23 formed in the cylinder block 13.

Air is drawn through an air cleaner assembly 24 and intake pipe 25 to a carburetor, indicated generally at 26, where the fuel-air mixture is formed. The carburetor 26 has an induction passage 27 that discharges into the cylinder block intake port 18 via a spacer 28 that is interposed between the carburetor 26 and cylinder block 13.

A rieton type throttle valve 29 is slidably supported by the carburetor body and is connected to the throttle control by means of a flexible cable 31 for controlling the speed of the engine by varying the effective cross-sectional area of the intake passage 27. The structure thus far described is conventional and, for that reason, further details have not been given.

For the reasons discussed above, the charging efficiency of a conventional engine at low speeds and with relatively small openings of the throttle valve is extremely poor due to the successive opening and closing of the intake port by the reciprocation of the piston 15. In order to offset these deficiencies and to improve charging efficencies, a plenum chamber, indicated generally by the reference numeral 32, is provided which communicates with the intake passage 27 downstream of the throttle valve 29. The plenum chamber 32 may be conveniently formed from a molded plastic and has a pair of mounting lugs 33 and 34 formed integrally with it which permit ready attachment to the motorcycle frame 12.

The plenum chamber 32 has an opening 35 which communicates with a flexible conduit 36 that, in turn, discharges into a tube 37 that is formed as a portion of the body of the carburetor 26. The tube 37 terminates at a bore 38 in which the piston-type throttle valve 29 reciprocates. On the opposite side of this bore 38 from the pipe 37, a passage 39 is formed which intersects the intake passage 27 downstream of the throttle valve 29.

The throttle valve 29 has an upstanding skirt portion 41 which is adapted to selectively control the communication of the pipe 37 and passage 39 with the bore 38 and accordingly, with each other. The skirt portion 41 is sized so that when the throttle valve 29 is in its idle position (FIG. 1 and broken view of FIG. 2) there will be free communication between the plenum chamber 32 and the intake passage 27 via the conduit 36, pipe 37, bore 38 and passage 39. When the throttle valve 29 is moved to its full throttle position (FIG. 2) the communication of the plenum chamber will be stopped by closure of the communication of the pipe 37 and conduit 39 with the bore 38. In intermediate positions there will be a varying flow resistance provided. Thus, the effect of the plenum chamber 32 on the induction system will be effective at low speeds and low throttle openings. Any deliterious effects which might occur at wide open throttle and low engine speed will be precluded by blockage due to the piston skirt portion 41.

When the engine is running with the throttle valve 29 in its idel or off idle position, a negative pressure will be exerted in the intake passage 27 at the time the piston 15 commences its upward movement. This negative pressure is transmitted through the conduit 36 to the plenum chamber 32. When the piston 15 closes the intake port 18, the negative pressure will still continue to exist in the plenum chamber 32 and the intake charge will continue to flow past the throttle valve 29 but now into the plenum chamber 32. On the next opening of the intake port 18 a portion of the charge will be delivered from the plenum chamber 32. In this way, a continued flow inertia is maintained even though the engine is operating at an extremely low speed.

As the throttle valve 29 is progressively opened the degree of communication of the plenum chamber 32 with the intake passage 27 will be progressively reduced. However, this is not significant since the flow inertia to the crank case 17 will be at a higher rate as the engine speed increases. Furthermore, at high throttle valve openings and low engine speeds it is desirable to preclude communication of the plenum chamber 32 with the intake passage 27 as aforenoted.

Embodiment of FIGS. 3 through 6

A second embodiment of this invention is identified generally by the reference numeral 51, which comprises a four-cycle type of internal combustion engine having any desired number of cylinders each of which is served by a single carburetor 52. The engine 51 includes a cylinder block 53 in which a cylinder bore 54 is formed. A piston 55 reciprocates in the cylinder bore 54 and drives a crankshaft (not shown) through a connecting rod in a known manner. A cylinder head 56 is affixed to the cylinder block 53 and is formed with an intake passage 57 that terminates at a main intake port which also forms the seat for an intake valve 58. The intake valve 58 is operated in any known manner, as by means of a rocker arm 59. An exhaust valve 61 is also supported in the cylinder head 56 and controls the flow through and exhaust passage 62 in a known manner.

The carburetor 52 has a butterfly-type throttle valve 63 which has affixed to its supporting shaft a drum 64 to which a flexible cable 65 is connected for operation by the vehicle operator in a known manner. The carburetor 52 discharges into the cylinder head intake passage 57 via a spacer 66 which in interposed between the carburetor 52 and the intake side of the cylinder head 56.

A plenum chamber 67 is provided that has a circuit 68 interconnecting the plenum chamber 67 with a valve, indicated generally by the reference numeral 69. The valve 69 controls the communication of the conduit 68 with an induction system pipe 71 that is affixed to the spacer 66 and which extends into the cylinder head intake passage 57 and terminates adjacent the head of the intake valve 58.

The valve 69 is of a rotary type and its details are best shown FIGS. 4–6. The valve 69 includes an outer housing 72 that is formed with a central passage 73. The passage 73 communicates with both the conduits 68 and 71. A rotary valve member 74 is supported within the passage 73 and has a cylindrical opening 75 which extends through it. When the opening 75 is aligned with the conduits 68 and 71 unrestricted flow is provided between them. When the valve passage 75 is rotated 90° from the position shown in FIG. 4, there will be substantially no communication between the conduits 68 and 71.

The valve element 74 has a stem portion 76 on which a pulley 77 is journaled. The pulley is connected to a flexible transmitter 78 that is in turn affixed to a connector 79 (FIG. 3) for connection with the accelerator cable 65 to a common actuator 81 that permits both the throttle valve 63 and the control valve element 74 to be operated in a manner to be described.

A lost motion connection is provided between the pulley 77 and the valve stem portion 76 so as to cause the throttle valve 63 to move toward its opened position a certain degree before the valve element 74 is moved toward its closed position. This lost motion connection comprises a hub portion 81 of the pulley that is formed with a circumferentially extending slot 82. A pin 83 is staked to the valve stem 76 and extends into the slot 82 as shown in FIG. 6.

A torsional spring 84 is staked to the valve housing 72 at one end and to the pulley 77 at its other end for rotating the pulley 77 and valve element 74 toward the opened position.

In operation the figures show the arrangement when the engine 51 is in its idling condition. The throttle valve 63 of the carburetor 52 will be closed and the control valve 69 will be in its opened position. Thus, at the completion of each intake stroke a negative pressure will be exerted in the plenum 67 that causes the charge from the carburetor 52 to enter the plenum chamber. During the next succeeding intake stroke at least a portion of this charge will be discharged into the combustion chamber of the engine from the plenum chamber 67 as with the previously described embodiment.

When the throttle valve 63 is opened by pulling the accelerator cable 81 and connector 79 the accelerator cable 65 will cause opening of the valve 63. During initial opening, the pulley 77 will rotate and the pin 83 will remain stationary due to the elongation of the slot 82. The valve element 74 will be held in its open position by means of a torsional spring 84 which acts on the valve element 74. Once the throttle valve 63 is opened to the amount determined by the length of the slot 82, the hub 81 will engage the pin 85 and cause the control valve element 74 to begin to move toward its closed position. Thus, the effect of the plenum chamber 67 will be decreased at increasing throttle opening as with the previously described embodiment and the same results will be affected.

From the foregoing description it should be readily apparent that two embodiments of induction systems have been disclosed each of which provides highly effective charging efficiency at low speeds and with low throttle openings through the use of a plenum chamber which insures continuity of flow through the intake system even when the associated engine chamber is not on its intake stroke. However, the effect of the plenum chamber is diminished as the throttle valve of the engine approaches its wide open position so as to avoid deleterious effects which may in some instances otherwise be encountered. Although two embodiments of the invention have been disclosed it is to be understood that the invention is susceptible of use in a wide variety of manners without departing from the spirit and scope of the invention, as defined by the appended claims.

What is claimed is:

1. An induction system for delivering intake charge to a variable volume chamber of an internal combustion engine having an induction passage for supplying the total of the intake charge to said chamber, a throttle valve for controlling the flow through said induction passage, a plenum chamber, and means communicating said plenum chamber only with said induction passage between said throttle valve and said chamber, said communicating means and said plenum chamber providing for flow of a portion of said intake charge from said induction passage into said plenum chamber during a portion of the engine operating cycle and providing flow from said plenum chamber to said induction passage of at least a part of said portion of said intake charge during at least a part of the induction cycle of said engine for supplementing the flow in said induction passage, and means for controlling the communication of said plenum chamber with said induction passage in response to a running condition of the engine comprising a control valve means operatively connected with said throttle valve and movable from an opened position when said throttle valve is in its idle position to a closed position when said throttle valve is in its fully opened position.

2. In an induction system as set forth in claim 1 wherein the control valve means comprises a rotary valve operatively connected to the throttle valve via a lost motion connection for opening of the throttle valve from its idle position to a predetermined partially opened position before said control valve is moved from its opened position toward its closed position.

3. In an induction system as set forth in claim 1 wherein the throttle valve is a piston-type throttle valve slidably supported within a housing, the control valve means comprising a portion of said piston which is effective to control the communication between the plenum chamber and the induction passage.

4. In an induction system as set forth in claim 3 wherein a skirt portion of the piston is slidably supported within a bore, there being conduit means extending from the plenum chamber to said bore and additional conduit means extending from said bore to the induction passage, the piston skirt portion being adapted to control the communication between said conduits.

* * * * *